July 13, 1937.  H. W. PRICE ET AL  2,086,576
CLUTCH CONTROL MECHANISM
Filed Nov. 27, 1931
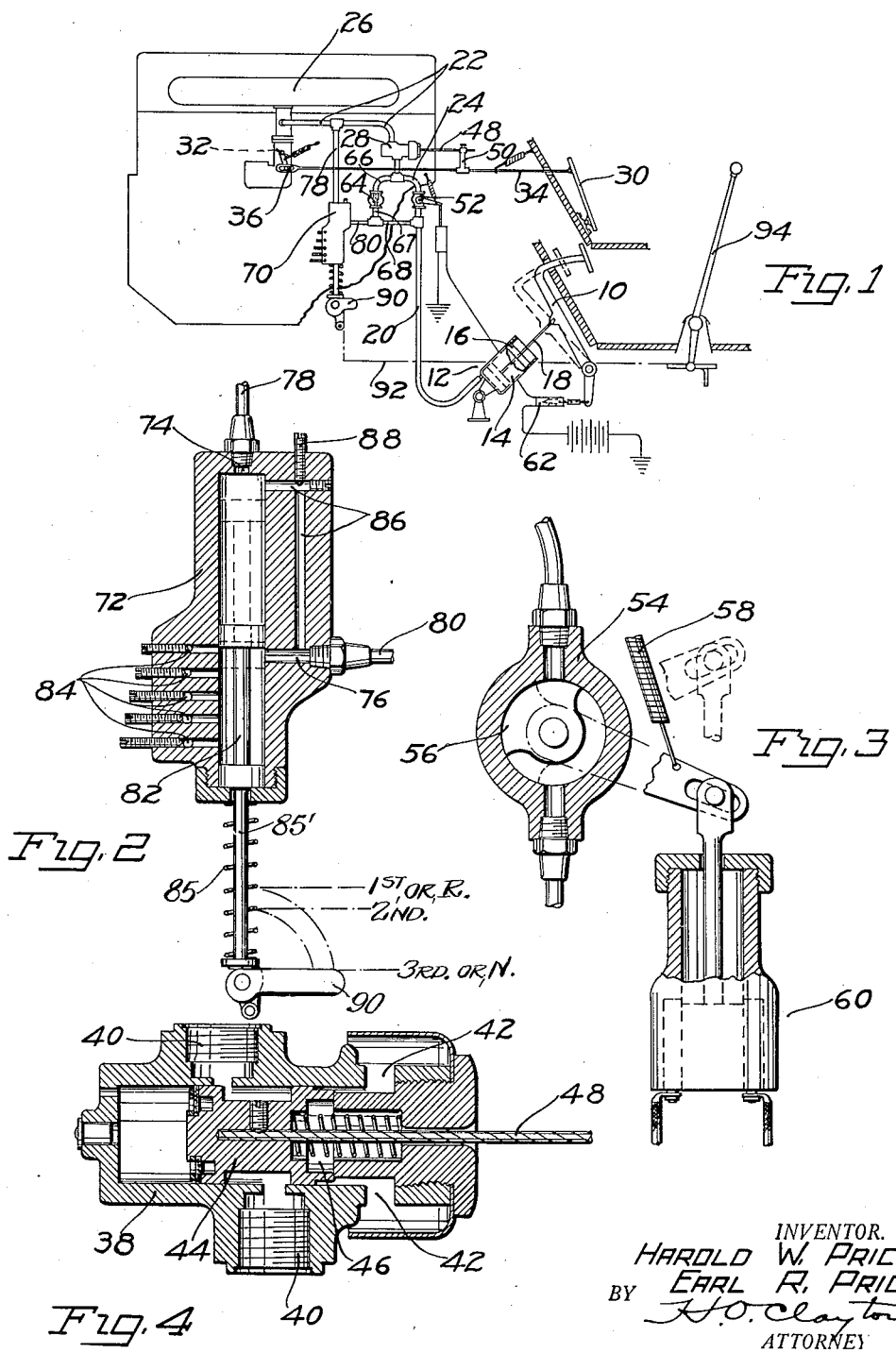
INVENTOR.
HAROLD W. PRICE
EARL R. PRICE
BY H. O. Clayton
ATTORNEY Patented July 13, 1937

2,086,576

UNITED STATES PATENT OFFICE 2,086,576

CLUTCH CONTROL MECHANISM

Harold W. Price and Earl R. Price, South Bend, Ind., assignors to Bendix Aviation Corporation, South Bend, Ind., a corporation of Delaware Application November 27, 1931, Serial No. 577,660

14 Claims. (Cl. 192—.01)

This invention relates to power operated clutch controlling mechanism for the standard clutch of an automotive vehicle, such mechanism being designed to supplant the manual operation of the clutch and to accurately simulate such manual operation.

The principal object of the invention is to provide, in a vacuum operated clutch controlling mechanism, means for regulating the disengagement and engagement of the clutch. More specifically, it is the object of the invention to provide valve means, so controlling the influx and efflux of air to and from the motor of the mechanism, as to insure, at the proper time, a rapid disengagement of the clutch and, what is more important, to provide for two stages or phases of clutch plate movement in the engagement of the clutch. The total elapsed time in effecting the engagement of the clutch is thus reduced to a minimum, the first of the aforementioned stages of movement being quite rapid and the latter stage appreciably slower to permit the clutch plates to engage without shock.

Yet another object of the invention is to provide electrical means, operable at a predetermined position in the throw of the clutch pedal, to operate a valve, and which valve serves to both initiate and terminate the rapid first stage of clutch plate movement.

A further object is to provide a check valve positioned in a shunt or by-pass fluid transmitting circuit, said valve being operable to insure a disengaging movement of the driving clutch plate prior to the opening of said electrically operated valve.

A further object of the invention is to provide, in conjunction with said aforementioned electrically operated valve, a fluid operated automatically operable valve, which valve is operable to a degree which is a function of the manifold vacuum and serves to control the last or clutch plate contacting stage of clutch plate movement.

Another object of the invention is to variably determine the maximum operation of the aforementioned automatically operated valve in accordance with the gear ratio setting of the change speed transmission mechanism to thus predetermine a maximum rate of clutch plate engaging movement for each gear setting.

A further object of the invention is to provide a second by-pass or shunt circuit interconnecting the source of vacuum, preferably the aforementioned manifold of the internal-combustion engine, with the aforementioned fluid motor, said circuit to provide an unimpeded fluid transmitting or bleed connection to compensate for leakage in the motor and also facilitate control of the clutch engaging operation of said motor.

Other objects of the invention and desirable details of construction and combinations of parts will become apparent from the following description of a preferred embodiment, which description is taken in conjunction with the accompanying drawing, in which:

Figure 1 is a diagrammatic view of the clutch controlling mechanism constituting the invention;

Figure 2 is a longitudinal sectional view through the automatic bleed valve for controlling the second stage of clutch engagement;

Figure 3 discloses, in section, the two-way cut-off valve and the solenoid operating means therefor; and Figure 4 discloses, in longitudinal section, the three-way control valve for the clutch operating fluid motor.

Referring now to that embodiment of the invention disclosed diagrammatically in Figure 1, there is provided a clutch pedal 10, the actuation of which is adapted to control the engagement and disengagement of a conventional clutch, not shown. The clutch pedal is power operated, by a vacuum operated fluid motor 12, in such fashion as to accurately simulate the conventional manual operation of the pedal.

The motor preferably comprises a cylinder 14, pivotally secured to the chassis, and a reciprocable piston 16, the latter being connected, by rod 18, to the clutch pedal 10. The cylinder is connected, by interconnected flexible conduits 20, 22 and 24, with an intake manifold 26 of the internal-combustion engine of the vehicle. An accelerator operated three-way valve 28, forming the subject matter of Patent No. 2,041,475, issued May 19, 1936, to Victor W. Kliesrath, is incorporated in the conduit 22 and serves, to an appreciable degree, to control the operation of the motor.

An accelerator pedal 30 is connected to an engine throttle 32, by a rod 34, there being a degree of lost motion at 36 for a purpose to be described hereinafter. The three-way valve 28, detailed in Figure 4, preferably comprises a casing 38, provided with ports 40, registering with the portions of the conduit 22, and also provided with atmospheric ports 42. A spring pressed valve plunger 44 having a recess 46 is actuated by a flexible connection 48, the latter connected to an arm 50 rigidly secured to the accelerator or throttle rod 34.

A two-way cut-off valve 52 comprising a casing 54 and a rotatable recessed member 56, is incorporated in the conduit 24 and is adapted to be actuated by a spring 58 and by a solenoid 60. The solenoid is energized, to close the valve, by the closing of a clutch pedal operated switch 62. The spring 58 serves to open the valve, to intercommunicate the motor and manifold, when and if the solenoid is deenergized with the opening of the pedal switch.

The invention further includes the incorporation of a check valve 64, incorporated in a by-pass or shunt circuit comprising conduit sections 66, 67 and 68, and which valve serves to insure operation of the motor as will be described in greater detail hereinafter.

A further feature of the invention resides in the provision of an automatically operated clutch controlling bleed valve 70, the details of which are not claimed herein inasmuch as the same forms the subject matter of our copending application Serial No. 577,659 filed concurrently herewith, and of our divisional application Serial No. 121,047, filed January 18, 1937. Briefly, this valve, shown in detail in Figure 2, comprises a casing 72, provided with ports 74 and 76 receiving conduit sections 78 and 80, said sections being connected, respectively, to the conduit 22 and to the aforementioned shunt conduit 68. A spool-shaped valve member 82 is adapted to be reciprocated in a bore of the casing 72 to register one or more of a plurality of set screw adjustable air bleed orifices 84 with the valve port 76. The position of the valve 82 is determined by three factors; namely, the manifold vacuum within the compartment in the casing 72 above the upper end of the valve, the atmosphere acting upon the lower end of the valve, and a return spring 85 interposed between the headed end of a valve stem 85' and the casing 72. The valve 82 in its upward position at closed throttle closes off the port 76 without, however, covering up the communication between the conduit 78 and ducts 86, the strength of the return spring 85 acting on the piston valve 82 being calibrated to effect this position of the valve when the clutch is disengaged. This position of the valve is shown in dotted lines in Figure 2 and insures the aforementioned unimpeded connection between the manifold and motor. The valve casing 72 is also provided with right-angularly extending ducts 86 providing a supplementary or by-pass connection between the conduits 78 and 80, the rate of air flow via the ducts being adjustable by means of a set screw 88 and also by the degree of pressure within the manifold determined by the mode of throttle operation. Thus ducts 86 provide a permanent connection with the manifold, facilitating the control of the clutch engagement as will be described in detail hereinafter.

The remaining structural feature of the invention comprises a cam 90, operable by a connection 92 with a conventional transmission or gear shift lever 94, and which is operative, to determine the completely released position of the spool valve member 82, in accordance with the transmission gear setting. Thus we may, as disclosed diagrammatically in Figure 2, have three settings of the valve member, one for low and reverse gear, one for second gear and one for the high gear setting of the transmission.

Referring now to the operation of the described structure, the parts are shown in their clutch engaged and engine inoperative position in the several figures of the drawing: thus the accelerator pedal is completely released to insure a closing of the throttle and an opening of the three-way valve 28. The bleed valve 70 is fully released, and lastly the switch 62 is closed to energize the solenoid 60 and close the two-way or cut-off valve 52.

Upon starting the engine with the throttle closed there is developed, in the manifold 26, a vacuum of some twenty inches of mercury which immediately serves, by virtue of the then established differential of pressure, to move the spool valve member 82 to the dotted line or closed position, Figure 2, cutting off port 76 to insure a disengagement of the clutch, and also to evacuate the motor via the conduit 22, valve 28, conduit 66, check valve 64 and conduits 67, 68 and 20. The weight of the atmosphere acting on the outer end of the piston 16 then effects a disengagement of the clutch, moving the pedal and piston to the dotted line positions of Figure 1. The switch 62 is opened, after the pedal has moved a relatively short distance, thereby permitting the spring 58 to open the cut-out valve 52 and more effectively evacuate the motor to disengage the clutch.

The transmission is then placed in low gear preparatory to starting the car, predetermining the position of the cam member 90 controlled by said transmission.

The accelerator pedal 30 is now actuated, first closing the three-way valve 28 by registering lower port 40 and ports 42, and then opening the throttle to speed up the engine. With the venting of the motor, via the three-way valve, open cut-out valve 52 and interconnected conduits, the piston and connected clutch pedal move relatively rapidly to engage the clutch, this by virtue of the relatively rapid influx of air to the motor. However, when the clutch pedal reaches a position just prior to the actual contacting of the driving and driven clutch plates, the switch 62 is closed to cut off the aforementioned influx of air via the three-way valve 28. Thereafter the air is bled into the motor via the openings 84 in the bleed valve 70, the degree of said air bleed being a function of the manifold vacuum which controls the position of the spool member 82 and also a function of the transmission setting which determines the maximum rate of bleed for a given transmission setting. Air is also bled into the motor from the manifold via the ducts 86 in the bleed valve, the rate of influx of air from this source being a function of the degree of manifold vacuum as determined by the control of the throttle. It will also be appreciated that should the accelerator be depressed only sufficiently to operate the valve 28 without opening the throttle, this operation being permitted by virtue of the slot 36, that the engagement of the clutch will be arrested or checked just at the point of clutch engagement. This operation is inherent in the mechanism in view of the function of the valve 52 as described above.

Should the accelerator be held in this clutch arrested position for any appreciable time, the permanent vacuum connection with the fluid motor 12 via the ducts 86 and conduits 78 will result in a sufficient evacuation of the motor to again disengage the clutch. However, if the clutch is disengaged to the point of breaking the switch 62, then the valve 52 will be again operated to connect the motor to the atmosphere via the valve 28 and the clutch will be reengaged. This oscillating or so-called "hunting" action at the clutch engaging point will continue indefinitely, should the accelerator remain in the aforementioned partially open position.

Upon continued depression of the accelerator, however, the throttle is opened as described above to open one or more of the bleed ports 84 and initiate a completion of the engagement of the clutch at a rate determined by the degree and/or mode of throttle manipulation. In maneuvering the car from a parked position, it is often necessary to slip the clutch and very carefully control its engagement. This may be accomplished with the mechanism of the invention, inasmuch as the accelerator may be released to a point where the air evacuated from the clutch motor via the ducts 86 just balances the influx of air to the motor via the bleed ports 84, thus maintaining the clutch engaged at a fixed point or constant load: with further release of the accelerator to completely close the throttle without operation of the valve 28, the aforementioned arrest point may again be found. Thus it is obvious that with careful manipulation of the accelerator the clutch may be successively engaged and released at will to facilitate maneuvering of the vehicle. The mode of clutch engagement is controlled completely by the mode of operation of the accelerator.

There is thus provided a power operated mechanism, automatic in its action, which accurately simulates a manual control of the clutch. The automatic operation of the bleed valve insures a rate of clutch plate contacting movement in accordance with the mode of operation of the engine throttle and the additional control of the bleed valve by the transmission setting provides a check upon the operation of said valve, which, in a measure, renders the mechanism fool-proof.

While one illustrative embodiment has been described, it is not our intention to limit the scope of the invention to that particular embodiment, or otherwise than by the terms of the appended claims.

We claim:

1. In an automotive vehicle provided with an internal-combustion engine and a clutch, an engine operated power means for operating said clutch, and means for controlling the operation of said power means, including successively operable electrically and pneumatically operated valves providing two distinct phases in the clutch engaging operation of said means.

2. An automotive vehicle provided with an internal-combustion engine and a clutch, and vacuum operated means for operating said clutch, said means including a single-ended fluid motor, fluid transmitting connections between said motor and engine and a three-way control valve for said motor incorporated in said connections, said connections further including successively operable electrically and pneumatically operated valves providing two distinct phases in the clutch engaging operation of said means.

3. In a vacuum operated clutch control mechanism for an automotive vehicle having an internal-combustion engine and a clutch, said mechanism including a fluid motor, connections between said motor and clutch and fluid transmitting connections between the intake manifold of said engine and said motor, said latter connections including a three-way control valve for said motor and further including a plurality of valves for controlling the mode of engagement of the clutch, two of said valves being vacuum operated and the remaining valve being electrically operated by a solenoid.

4. In a vacuum operated clutch control mechanism for an automotive vehicle having an internal-combustion engine and a clutch, said mechanism including a fluid motor, a force transmitting connection between said motor and clutch and fluid transmitting connections between the intake manifold of said engine and said motor, said latter connections including a three-way control valve for said motor and further including three valves for controlling the mode of engagement of the clutch, two of said valves being automatically operated by vacuum and the remaining valve being electrically operated by a solenoid, together with means, operable by the transmission, for determining the mode of operation of one of said vacuum operated valves.

5. In a vacuum operated clutch control mechanism for an automotive vehicle provided with an intake manifold and a clutch pedal, said mechanism including a fluid motor, an operative connection between said motor and clutch pedal and a fluid transmitting connection between said motor and manifold, a three-way control valve incorporated in said connection, means for controlling the clutch engaging operation of said motor, said means including a two-way cut-off valve also incorporated in said connection, and means, operable by the clutch pedal, for operating said two-way valve.

6. In a vacuum operated clutch control mechanism for an automotive vehicle provided with an intake manifold and a clutch pedal, said mechanism including a fluid motor, an operative connection between said motor and clutch pedal and a fluid transmitting connection between said motor and manifold, a three-way control valve incorporated in said connection, means for controlling the clutch engaging operation of said motor, said means including a two-way cut-off valve also incorporated in said connection, and electrically operated power means, operable by the clutch pedal, for operating said two-way valve, said last mentioned means including a solenoid and a switch for controlling said solenoid, said switch being operable by the clutch pedal.

7. In a vacuum operated clutch control mechanism for an automotive vehicle provided with an intake manifold, a throttle, an accelerator pedal, a connection between said pedal and throttle, and a clutch pedal, said mechanism including a fluid motor, a mechanical connection between said motor and clutch and a fluid transmitting connection between said motor and manifold, an accelerator operated three-way control valve incorporated in said fluid transmitting connection, means for controlling the clutch engaging operation of said motor, said means including a two-way cut-off valve also incorporated in said connection, and means, operable by the clutch pedal, for operating said two-way valve to, in a measure, control the clutch engaging operation of said motor.

8. In a vacuum operated clutch control mechanism for an automotive vehicle provided with an intake manifold and a clutch pedal, said mechanism including a fluid motor, an operative connection between said motor and clutch pedal, and fluid transmitting connections between said motor and manifold, a three-way control valve incorporated in said connections, and means for controlling the clutch engaging operation of said motor, said means comprising a valve, operative to cut off communication between said manifold and motor, via said valve, when the clutch pedal is released, and further operative to maintain communication between the manifold and motor, via said valve, when the clutch pedal is depressed and throughout a portion of the stroke of the clutch pedal as it moves toward its clutch engaged position, and other valve means incorporated in said connections and operative to maintain communication between the manifold and motor, via said valve means, when the motor is being energized to disengage the clutch, and further operative to cut off communication between said manifold and motor, via said valve means, when the motor is being deenergized to engage the clutch.

9. In a vacuum operated clutch control mechanism for an automotive vehicle provided with an intake manifold and a clutch pedal, said mechanism including a fluid motor, an operative connection between said motor and clutch pedal, and fluid transmitting connections between said motor and manifold, a three-way control valve incorporated in said connections, and means for controlling the clutch engaging operation of said motor, said means comprising a valve, operative to cut off communication between said manifold and motor, via said valve, when the clutch pedal is released, and further operative to maintain communication between the manifold and motor, via said valve, when the clutch pedal is depressed and throughout a portion of the stroke of the clutch pedal as it moves toward its clutch engaged position, and other valve means incorporated in said connections and operative to maintain communication between the manifold and motor, via said valve means, when the motor is being energized to disengage the clutch, and further operative to cut off communication between said manifold and motor, via said valve means, when the motor is being deenergized to engage the clutch, together with still other valve means operable by and in accordance with the manifold vacuum for controlling the last stage of movement of the clutch pedal to complete the engagement of the clutch.

10. In a vacuum operated clutch control mechanism for an automotive vehicle provided with an internal-combustion engine and a clutch, said engine provided with an intake manifold, a vacuum operated fluid motor operatively connected with the clutch, a fluid transmitting connection interconnecting the motor and the manifold, a three-way control valve incorporated in said connection, a second fluid transmitting connection interconnecting said motor and manifold and by-passing said control valve during the operation of the latter to effect an engagement of the clutch whereby there is provided a means, other than said control valve, for increasing the gaseous pressure within said motor to effect an engagement of the clutch and thereby to, in part, control said engagement in accordance with the degree of manifold vacuum.

11. In a vacuum operated clutch control mechanism for an automotive vehicle provided with an internal-combustion engine and a clutch, said engine provided with an intake manifold, a vacuum operated fluid motor operatively connected with the clutch, a fluid transmitting connection interconnecting the motor and the manifold, a three-way control valve incorporated in said connection, a second fluid transmitting connection interconnecting said motor and manifold and by-passing said control valve during the operation of the latter to effect an engagement of the clutch whereby there is provided a means, other than said control valve, for increasing the gaseous pressure within said motor to effect an engagement of the clutch and thereby to, in part, control said engagement in accordance with the degree of manifold vacuum, together with a valve incorporated in said second fluid transmitting connection, said valve being also operative to control the degree of gaseous pressure within the motor to control its clutch engaging operation.

12. In a vacuum operated clutch control mechanism for an automotive vehicle provided with an internal-combustion engine and a clutch, said engine provided with an intake manifold, a vacuum operated fluid motor operably connected with said clutch, a fluid transmitting connection interconnecting one end of said motor with the manifold, a three-way control valve incorporated in said connection, and a second unimpeded but restricted fluid transmitting connection interconnecting said manifold and motor whereby there is provided means for both compensating for leakage into said vacuum operated motor when the latter is energized to disengage the clutch and for, in part, controlling the clutch engaging operation of said motor in accordance with the degree of manifold vacuum.

13. In a vacuum operated clutch control mechanism for an automotive vehicle provided with an internal-combustion engine and a clutch, said engine provided with an intake manifold, a vacuum operated fluid motor operably connected with said clutch, fluid transmitting connections interconnecting said manifold and motor, said connections including a valve automatically operative by and in accordance with the manifold vacuum to control the mode of clutch engaging operation of said motor, together with manually operable stop means selectively operable by the driver to regulate the operation of said automatically operable valve.

14. In an automotive vehicle provided with a clutch and an intake manifold, a single-ended pressure differential operated motor operably connected to said clutch, fluid transmitting connections interconnecting said manifold and motor, said connections including an unimpeded connection to provide means maintaining a constant communication between the manifold and motor, and control valve means for said motor incorporated in said fluid transmitting connections, said unimpeded connection by-passing the connections in which said control valve means is incorporated.

HAROLD W. PRICE.
EARL R. PRICE.